United States Patent [19]
Griffin

[11] Patent Number: 5,566,715
[45] Date of Patent: Oct. 22, 1996

[54] FLOOD PREVENTION VALVE

[76] Inventor: Harry G. Griffin, 2005 Mumphrey Rd., Chalmette, La. 70043

[21] Appl. No.: 539,594

[22] Filed: Oct. 5, 1995

[51] Int. Cl.$^6$ .............................. F17D 3/00; F16K 31/12
[52] U.S. Cl. ................ 137/624.11; 251/304; 251/89; 137/551
[58] Field of Search .................. 137/624.11, 551; 251/65, 89, 304

[56] References Cited

U.S. PATENT DOCUMENTS

| | | | |
|---|---|---|---|
| 4,600,032 | 7/1986 | Heyl | 251/304 X |
| 4,708,264 | 11/1987 | Bruninga | 137/624.11 X |
| 4,807,664 | 2/1989 | Wilson et al. | 137/624.11 |
| 5,287,884 | 2/1994 | Cohen . | |
| 5,316,035 | 5/1994 | Collins et al. | 137/551 X |

Primary Examiner—Kevin Lee
Attorney, Agent, or Firm—Joseph N. Breaux

[57] ABSTRACT

A flood prevention valve including a rotary valve assembly having an input line, an output line, a rotating valve vane including an internal magnetic coupling ring affixed to the rotating valve vane, an external magnetic coupling ring having a coupling gear secured concentrically thereto, and a gearing linkage having at least one linking gear enmeshed with the coupling gear; a gear stop mechanism including a solenoid having a stop member positionable by the solenoid in a manner such that the stop member engages and prevents a linking gear from rotating in response to a first electrical signal to the solenoid and disengages and allows a linking gear to rotate in response to a second electrical signal to the solenoid, a timer circuit having a magnetic sensor capable of detecting rotation of the internal magnetic coupling ring; a timing circuit for timing the rotation intervals of the internal magnetic coupling ring; and, an output circuit in electrical connection with the solenoid that puts out a first predetermined signal to the solenoid when a predetermined rotation interval has been exceeded.

16 Claims, 3 Drawing Sheets

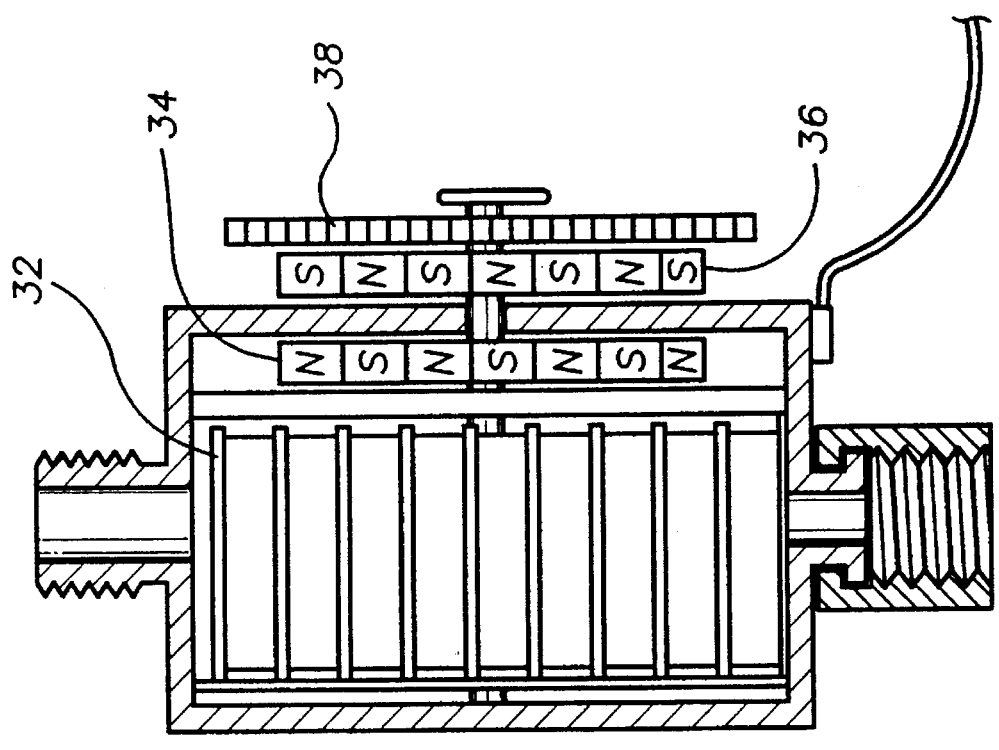

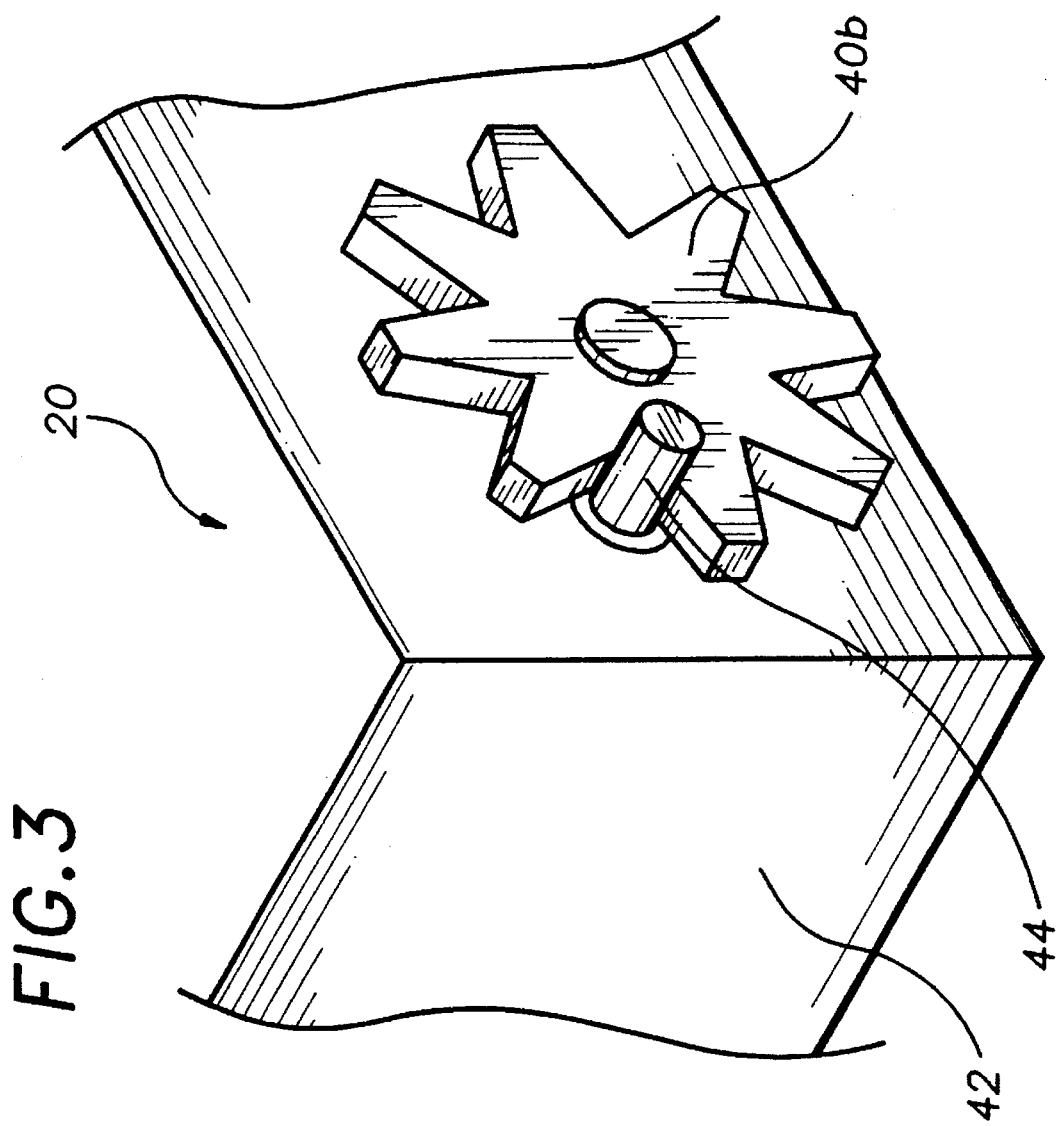

FLOOD PREVENTION VALVE

TECHNICAL FIELD

The present invention relates to valves for controlling the flow of fluids and more particularly to valves for controlling the flow of fluids that include a controller having a monitor for monitoring the flow of fluid through the valve and closing the valve if flow through the valve has occurred for a period exceeding a predetermined flow interval.

BACKGROUND ART

Ruptured water lines and malfunctioning equipment connected to water lines can result in serious flooding to the interior of a building or home. The flooding generally occurs when the equipment or building is unoccupied by anyone who can detect the accumulation of water and shut off the water supply to the building. Because it is not always possible to have a person supervising equipment or within the building twenty-four hours a day, it would be desirable to have a valve assembly installed within the water lines of the building that would prevent the flow of water through the water line once a flow period through the line exceeds a predetermined interval. It would be a further benefit if the valve were easily connectable with the waterline input of an appliance such as a dishwasher or washing machine. It would also be desirable if the user could adjust the predetermined flow interval to accommodate specific appliances or waterlines. In addition, it would be a benefit if the valve included telephone alert capability for sending an alarm signal to a receiving station alerting an operator of possible flooding conditions within a building.

GENERAL SUMMARY DISCUSSION OF INVENTION

It is thus an object of the invention to provide a flood prevention valve that is installable in connection with the water Lines of a building that prevents the flow of water through the water line once a flow period through the line exceeds a predetermined period.

It is a further object of the invention to provide a flood prevention valve that is easily connectable at the waterline input of an appliance such as a dishwasher or washing machine.

It is a still further object of the invention to provide a flood prevention valve that allows the user to adjust the predetermined flow period through the valve to accommodate specific appliances or waterlines.

It is a still further object of the invention to provide a flood prevention valve that includes telephone alert mechanism for sending an alarm signal to a receiving station alerting an operator of possible flooding conditions within a building.

It is a still further object of the invention to provide a flood prevention valve that achieves all or some of the above objects in combination.

Accordingly, flood prevention valve is provided. The flood prevention valve includes a rotary valve assembly having an input line, an output line, a rotating valve vane including an internal magnetic coupling ring affixed to the rotating valve vane, an external magnetic coupling ring having a coupling gear secured concentrically thereto, and a gearing linkage having at least one inking gear enmeshed with the coupling gear; a gear stop mechanism including a solenoid having a stop member positionable by the solenoid in a manner such that the stop member engages and prevents a linking gear from rotating in response to a first electrical signal to the solenoid and disengages and allows a linking gear to rotate in response to a second electrical signal to the solenoid, a timer circuit having a magnetic sensor capable of detecting rotation of the internal magnetic coupling ring; and, an output circuit in electrical connection with the solenoid that puts out a first predetermined signal to the solenoid when a predetermined rotation interval has been exceeded. The timing circuit preferably includes an adjusting mechanism for allowing the user to adjust the time period of the rotation interval.

In use, each rotation of the valve vane allows a quantity of fluid to flow between the input and the output of the valve assembly. When the valve vane is prevented from rotating by actuation of the gear stop mechanism, flow of fluid between the valve input and the valve output is prevented. The magnetic attraction between the internal and external magnetic coupling rings supplies the transmission medium for transmitting the stopping force between the gear stop mechanism and the valve vane.

The flood prevention valve preferably includes a conventional female hose coupling at the valve input and a conventional male hose coupling at the valve output. The flood prevention valve may also be equipped with a phone notification system in electrical connection with the timer circuit that is capable of dialing a preset phone number and transmitting a message to a receiving station at a remote location.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a section view of the flood prevention valve of FIG. 1 along the line I—I showing the rotating valve vane, the internal magnetic coupling ring, the external magnetic coupling ring, and a first linking gear.

FIG. 3 is a detail, perspective view showing the solenoid housing, the gear stop, and a second linking gear.

EXEMPLARY MODE FOR CARRYING OUT THE INVENTION

Figure 1:
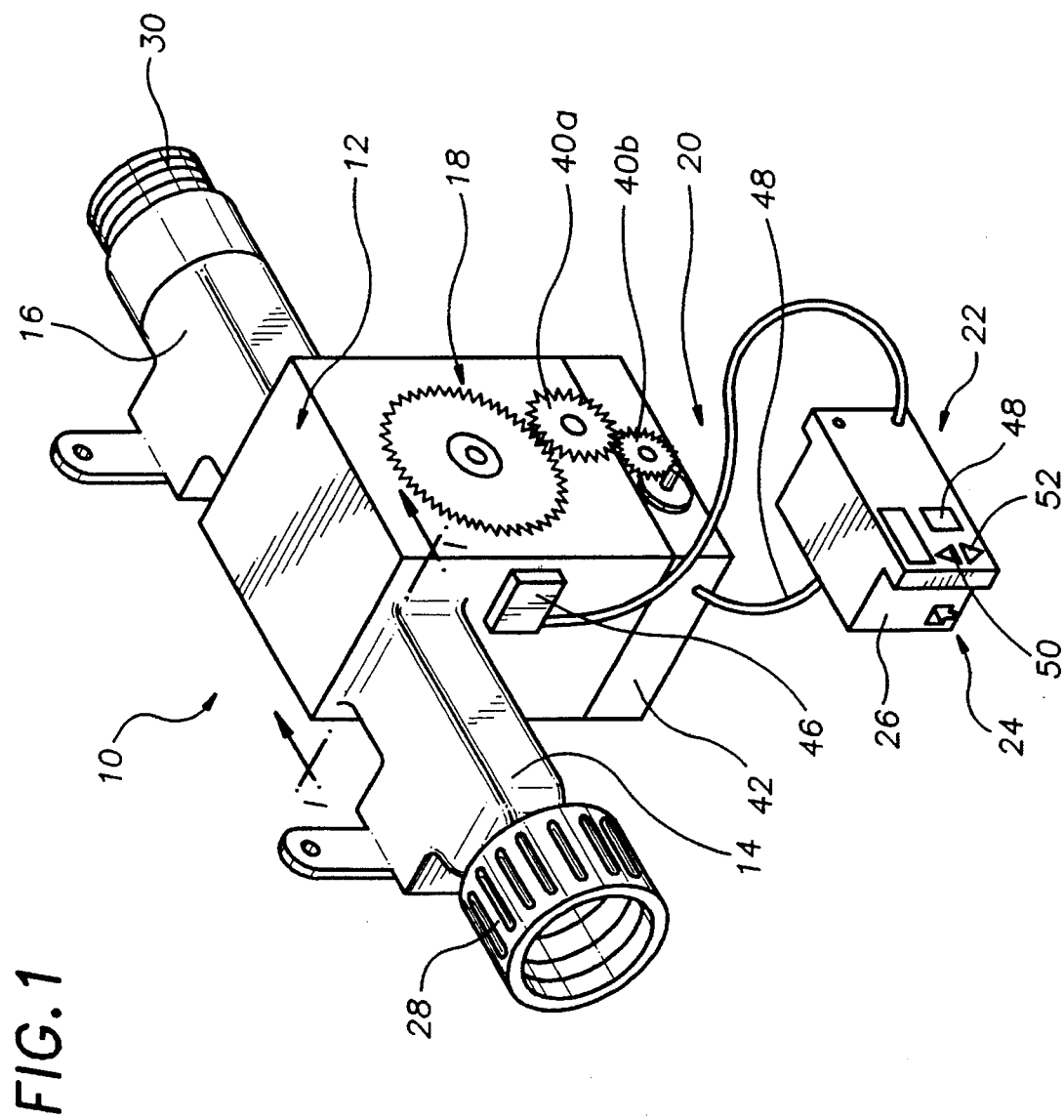
FIG. 1 is a perspective view of an exemplary embodiment of the flood prevention valve of the present invention.

FIG. 1 shows an exemplary embodiment of the flood prevention valve of the present invention generally designated by the numeral 10. Flood prevention valve 10 includes a rotary valve assembly, generally designated by the numeral 12, having an input line 14, an output line 16, and a valve mechanism, generally designated by the numeral 18; a gear stop mechanism, generally designated by the numeral 20; a timer circuit, generally designated by the numeral 22; and a phone notification system, generally designated by the numeral 24, housed within a control housing 26.

A conventional female hose coupling 28 is provided on valve input line 14 and a conventional male hose coupling 30 is provided on valve output line 16.

With reference to FIG. 2, valve mechanism 18 includes a rotating valve vane 32, an internal magnetic coupling ring 34 affixed to rotating valve vane 32, an external magnetic coupling ring 36, a coupling gear 38 secured concentrically to external coupling ring 36, and a gearing linkage 40*a*, 40*b* (shown in FIG. 1) having at least one linking gear 40*a* enmeshed with coupling gear 38. Each coupling ring 34,36 is constructed from sections of magnetic material having alternating North and South magnetic polarity. The magnetic attraction between internal coupling ring 36 and external coupling ring 38 is sufficient to restrain valve vane 32 from rotating when external coupling ring 36 is fixed.

FIG. 3 is a detail perspective view of gear stop mechanism 20. Gear stop mechanism 20 includes including a solenoid 42 having a stop member 44 positionable by solenoid 42 in a manner such that stop member 44 engages and prevents linking gear 40b from rotating. Solenoid 42 can also withdraw stop member 44 into solenoid 42 disengaging stop member 44 from linking gear 40b allowing linking gear 40b to rotate.

With reference once again to FIG. 1, timing circuit 22 includes a magnetic sensor 46 capable of detecting rotation of internal magnetic coupling ring 34. Timing circuit 22 begins a timing sequence each time magnetic coupling ring 34 changes from a non-rotating condition to a rotating condition and resets each time magnetic coupling ring 34 changes from a rotating condition to a non-rotating condition. If the rotating condition persists past a predetermined time interval, timing circuit 22 outputs a signal to solenoid 42 via an output cable 48 that causes gear stop member 44 to engage linking gear 40b stopping rotation of valve vane 32 and consequently the flow of water through valve 10.

A reset button 48 is provided to reset stop member 44 and allow linking gear 40b to rotate. An increase interval button 50 and a decrease interval button 52 are also provided to allow a user to increase or decrease the predetermined time interval as desired. Phone notification system 24 is housed within control housing 26 and is in electrical connection with timer circuit 22. Phone notification system 24 is capable of dialing a preset phone number and transmitting a message to a receiving station at a remote location.

Use of valve 10 is now described with general reference to FIGS. 1–3. In use, each rotation of valve vane 32 allows a quantity of fluid to flow between input line 14 and output line 16. In this exemplary embodiment, female coupler 28 is coupled to the male end of a flexible connecting hose and male coupler 30 is secured to the waterline input of a washing machine. The timing interval is then set to exceed the longest water receiving interval for the particular washing machine and notification system 24 is connected to a telephone jack. If the washing machine malfunctions during a water receiving cycle, timing circuit 22 will shut off water flow through valve 10 and consequently the washing machine prior to flooding of the building or home. In addition, notification system 24 will dial the predetermined number and make the emergency notification.

It can be seen from the preceding description that flood prevention valve has been provided that is installable in connection with the water lines of a building that prevents the flow of water through the water line once a flow period through the line exceeds a predetermined period; that is easily connectable at the waterline input of an appliance such as a dishwasher or washing machine; that allows the user to adjust the predetermined flow period through the valve to accommodate specific appliances or waterlines; and that includes telephone alert mechanism for sending an alarm signal to a receiving station alerting an operator of possible flooding conditions within a building.

It is noted that the embodiment of the flood prevention valve described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A flood prevention valve comprising:

a rotary valve assembly having an input line, an output line, a rotating valve vane including an internal magnetic coupling ring affixed to said rotating valve vane, an external magnetic coupling ring having a coupling gear secured concentrically thereto, and a gearing linkage having at least one linking gear enmeshed with said coupling gear;

a gear stop mechanism including a solenoid having a stop member positionable by said solenoid in a manner such that said stop member engages and prevents said linking gear from rotating in response to a first electrical signal to said solenoid and disengages and allows said linking gear to rotate in response to a second electrical signal to said solenoid;

a timer circuit having a magnetic sensor capable of detecting rotation of said internal magnetic coupling ring; and an output circuit in electrical connection with said solenoid that puts out a first predetermined signal to said solenoid when a predetermined rotation interval has been exceeded.

2. The flood prevention valve of claim 1, wherein:

said timing circuit includes an adjusting mechanism for adjusting said time period of said rotation interval.

3. The flood prevention valve of claim 1, wherein:

a conventional female hose coupling is provided at said valve input and a conventional male hose coupling is provided at said valve output.

4. The flood prevention valve of claim 1 further including:

a phone notification system in electrical connection with said timer circuit that is capable of dialing a preset phone number and transmitting a message to a receiving station at a remote location.

5. The flood prevention valve of claim 1 wherein:

each said coupling ring is constructed from sections of magnetic material having alternating North and South magnetic polarity.

6. The flood prevention valve of claim 2, wherein:

a conventional female hose coupling is provided at said valve input and a conventional male hose coupling is provided at said valve output.

7. The flood prevention valve of claim 2 further including:

a phone notification system in electrical connection with said timer circuit that is capable of dialing a preset phone number and transmitting a message to a receiving station at a remote location.

8. The flood prevention valve of claim 2 wherein:

each said coupling ring is constructed from sections of magnetic material having alternating North and South magnetic polarity.

9. The flood prevention valve of claim 6 further including:

a phone notification system in electrical connection with said timer circuit that is capable of dialing a preset phone number and transmitting a message to a receiving station at a remote location.

10. The flood prevention valve of claim 6 wherein:

each said coupling ring is constructed from sections of magnetic material having alternating North and South magnetic polarity.

11. The flood prevention valve of claim 10 further including:

a phone notification system in electrical connection with said timer circuit that is capable of dialing a preset phone number and transmitting a message to a receiving station at a remote location.

12. The flood prevention valve of claim 3 further including:

a phone notification system in electrical connection with said timer circuit that is capable of dialing a preset phone number and transmitting a message to a receiving station at a remote location.

13. The flood prevention valve of claim 3 wherein:

each said coupling ring is constructed from sections of magnetic material having alternating North and South magnetic polarity.

14. The flood prevention valve of claim 13 further including:

a phone notification system in electrical connection with said timer circuit that is capable of dialing a preset phone number and transmitting a message to a receiving station at a remote location.

15. The flood prevention valve of claim 5 further including:

a phone notification system in electrical connection with said timer circuit that is capable of dialing a preset phone number and transmitting a message to a receiving station at a remote location.

16. The flood prevention valve of claim 15, wherein:

said timing circuit includes an adjusting mechanism for adjusting said time period of said rotation interval.

* * * * *